United States Patent [19]

Toyota et al.

[11] Patent Number: 4,933,393

[45] Date of Patent: Jun. 12, 1990

[54] POLYOLEFIN COMPOSITION

[75] Inventors: Akinori Toyota; Mamoru Kioka, both of Iwakuni; Takeshi Shiraki, Yamaguchi; Kunie Hiroshige, Iwakuni, all of Japan

[73] Assignee: Mitsui Petrochemical Industries, Ltd., Tokyo, Japan

[21] Appl. No.: 269,576

[22] Filed: Nov. 10, 1988

[30] Foreign Application Priority Data

Nov. 13, 1987 [JP] Japan .................. 62-285614

[51] Int. Cl.$^5$ ...................... C08L 23/04; C08L 23/06
[52] U.S. Cl. .................................... 525/240; 525/324; 525/319
[58] Field of Search ................................ 525/240, 324

[56] References Cited

U.S. PATENT DOCUMENTS 4,786,687 11/1988 Sano et al. ...................... 525/240
4,792,588 12/1988 Suga et al. ...................... 525/240

FOREIGN PATENT DOCUMENTS 4730293 8/1972 Japan .
5841309 9/1983 Japan .

Primary Examiner—Carman J. Seccuro
Attorney, Agent, or Firm—Sherman and Shalloway

[57] ABSTRACT

An injection-molding polyolefin composition suitable for obtaining an injection-molded article having excellent sliding property and excellent impact resistance and being free from delamination, said polyolefin composition being characterized in that (1) the composition consists substantially of an ultrahigh-molecular-weight polyolefin having an intrinsic viscosity of 10–40 dl/g as measured in decalin of 135° C. and a low-molecular-weight to high-molecular-weight polyolefin having an intrinsic viscosity of 0.1–5 dl/g as measured in decalin of 135° C., (2) the ultrahigh-molecular-weight polyolefin is contained in the composition in an amount of 10–40% by weight based on the total weight of the ultrahigh-molecular-weight polyolefin and the low-molecular-weight to high-molecular-weight polyolefin, (3) the composition has an intrinsic viscosity $[\eta]c$ of 3.5–15 dl/g as measured in decalin of 135° C., (4) the composition has a melt torque T of 4.5 kg.cm or below, and (5) the section of the injection-molded square plate produced from the composition has a phase-separated structure composed of a continuous phase and a discontinuous phase and the average paticle diameter (average major axis length) of the discontinuous phase is 20 μm or below.

6 Claims, No Drawings

POLYOLEFIN COMPOSITION

FIELD OF TECHNOLOGY

The present invention relates to an injection-molding polyolefin composition suitable for obtaining injection-molded articles having excellent sliding property and excellent impact resistance and being free from delamination.

BACKGROUND TECHNOLOGY

Ultrahigh-molecular-weight polyolefins, for example ultrahigh-molecular-weight polyethylene, have higher impact strength, abrasion resistance, chemical resistance, tensile strength, etc. than general-purpose polyolefins such as general-purpose polyethylene, and have found increasing applications as engineering plastics. The ultrahigh-molecular-weight polyethylene, however, has the defect that is is very difficult to mold by extrusion or injection-molding because it has a much higher melt viscosity and thus lower flowability than general-purpose polyethylene.

At present, therefore, most articles from ultrahigh-molecular-weight polyethylene are produced by compression molding, and only some articles such as rods are produced by extrusion-molding at very low speeds.

When such ultrahigh-molecular-weight polyethylene having low melt-flowability is molded by an ordinary injection-molding method, shear broken streams of the polymer always form during the filling of the polymer in a mold cavity, and the resulting molded article undergoes delamination like mica and cannot exhibit the excellent properties of the ultrahigh-molecular-weight polyethylene. Rather, its quality is inferior to that of a molded article of general-purpose polyethylene.

Japanese Patent Publication Nos. 30067/1982 and 58010/1985 propose a injection-molding method free from causing delamination in which the capacity of a mold cavity is slightly increased before or after a resin is filled in the cavity, and then the resin is compressed to a predetermined volume. This method enabled production of injection-molded articles free from delamination and having the impact strength and abrasion resistance which are the inherent characteristics of the ultrahigh-molecular-weight polyethylene. To perform injection molding by this method, however, it is necessary to use an injection-molding machine equipped with a variable mold cavity system, and the general injection-molding machine for polyethylene cannot be used as it is.

On the other hand, for improving the melt-flowability of ultrahigh-molecular-weight polyolefins, mixing of an ultrahigh-molecular-weight polyolefin with a low to a high molecular weight polyolefin was proposed.

Japanese Patent Publication No. 27,064/1971 discloses an abrasion-resistant polyethylene resin composition comprising polyethylene having an average molecular weight of at least 500,000 and 20 to 50% by weight of polyethylene having a density of at least 0.940 and an average molecular weight of 30,000 to 120,000.

Japanese Patent Publication No. 30,293/1972 discloses a process for producing a material for use in that surface of agricultural machines, earth-moving machines, etc. which comes into contact with the soil, which comprises mixing screw-extrudable polyethylene having a molecular weight of not more than 200,000 and produced by the medium-pressure or the low-pressure method with 10 to 30% by weight of ultrahigh-molecular-weight polyethylene having a molecular weight of about 1 million and being incapable of screw extrusion, melting the mixture uniformly, and continuously molding the uniform molten mixture by an extruder.

Japanese Patent Publication No. 41,309/1983 discloses a polyethylene composition comprising a mixture of 85 to 50 parts by weight of polyethylene having a viscosity average molecular weight of 500,000 to 150,000 and 15 to 50 parts by weight of granular ultrahigh-molecular-weight polyethylene having a viscosity average molecular weight of at least 1 million and a particle size smaller than 10 mesh.

Japanese Laid-Open Patent Publication No. 177,036/1982 discloses an ultrahigh-molecular-weight polyethylene composition having improved moldability comprising 100 parts by weight of ultrahigh-molecular-weight polyethylene having a molecular weight of at least 1 million and 10 to 60 parts by weight of low-molecular-weight polyethylene having a molecular weight of 5,000 to 20,000. The specification of this patent document states that the moldability of this ultrahigh-molecular-weight polyethylene composition is such that in the production of a slab having a thickness of 50 mm by a compression molding method, the molding cycle required was decreased to 200° C.×2 hours while with the ultrahigh-molecular-weight polyethylene alone a molding cycle of 200° C.×3 hours was required; and that in a ram extrusion method, the speed of pipe extrusion was increased from 5 cm/min. to 10 cm/min.

Japanese Laid-Open Patent Publication No. 126,446/1984 discloses an ultrahigh-molecular-weight polyethylene resin composition comprising 95 to 50 parts by weight of an ultrahigh-molecular-weight polyethylene resin and 5 to 50 parts by weight of a general-purpose polyolefin resin. The specification of this document discloses a composition in which a silane-modified polyethylene resin having a melt index of 2.5 or 5.0 g/10 min. is used as an actual specific example of the general-purpose polyolefin resin.

Japanese Patent Publication No. 41,309/1983 discloses a polyethylene composition comprising a mixture of 85 to 50 parts by weight of polyethylene having a viscosity average molecular-weight of 500,000 to 150,000 and 15 to 50 parts by weight of granular ultrahigh-molecular-weight polyethylene having a viscosity average molecular weight of at least 1 million and a particle size smaller than 10 mesh. As stated in column 3, lines 17-28 of this document, the moldability of the ultrahigh-molecular-weight polyethylene in this composition has not improved, but the purpose of providing this composition is to produce a molded article having excellent impact strength by reducing anisotropy utilizing the granular state of the ultrahigh-molecular-weight polyethylene.

The above polyethylene resin compositions are prepared by mixing ultrahigh-molecular-weight polyethylene with polyethylene or other polyolefins having lower molecular weights.

Japanese Laid-Open Patent Publication No. 94,593/1979 (corresponding to U.S. Pat. No. 4,414,369) discloses a process for producing a polyolefin having a broad molecular weight distribution by polymerizing an olefin in the presence of a solvent and hydrogen using a Ziegler-type catalyst of enhanced activity supported on a solid carrier using a plurality of reactors, to produce a polyolefin continuously, which comprises continuously feeding a main olefin monomer and at least one olefin comonomer under pressure to the reactor in which a gaseous phase containing an inert gas is present in the upper part of a first-stage reactor, and copolymerizing these monomers, continuously transferring the polymerization reaction mixture in which high-molecular-weight polymer particles are dispersed in a solvent to a second-stage reactor composed of a vertical stirred vessel maintained at a lower pressure than the first-stage reactor by differential pressures without substantially separating part of the components in the mixture and without using any forced transferring means, continuously performing polymerization in the second-stage stirred vessel in the presence of the main olefin monomer and hydrogen while a gaseous phase exists in the upper part of the stirred vessel, thereby to form a polymer having a lower molecular weight than in the first stage polymerization, continuously withdrawing the polymerization reaction mixture containing the resulting polymer particles dispersed in a solvent from the second-stage stirred vessel, and recovering the polymer.

Japanese Patent Publication No. 10,724/1984 (corresponding to U.S. Pat. No. 4,336,352) discloses a process in which polyethylenes of different molecular weights are produced by multi-stage continuous polymerization in at least three polymerization vessels connected in series. The purpose of this process is to produce polyethylene having excellent properties and moldability with high productivity. With regard to moldability, this process is for producing polyethylene by extrusion molding, above all blow molding, with improved die swelling. It does not relate to an improvement in an injection-molded article. Even when a composition containing not more than 10% by weight of ultrahigh-molecular-weight polyethylene and having an MI of 0.3 or an intrinsic viscosity [$\eta$] of 2.3 to 3.0 dl/g (corresponding to an MI of about 0.2 to 0.8) is used in injection molding, the content of ultrahigh-molecular-weight polyethylene is as low as not more than 10% by weight.

Japanese Patent Publication No. 11,349/1971 discloses a process which comprises producing 5 to 30% by weight of an ethylene/alpha-olefin copolymer having a reduced specific viscosity of 30 to 5 in a first step, and producing polyethylene or an ethylene/alpha-olefin copolymer having a reduced specific viscosity of 4.6 to 1.5 in a second stage to obtain a homogeneous mixture of it with the polymer obtained in the first stage. The purpose of this process is to improve moldability in the extrusion molding of bottles, cables, pipes, etc. and does not pertain to an improvement in an injection-molded article.

Japanese Laid-Open Patent Publication No. 141,409/1982 discloses a process for producing polyethylene which comprises polymerizing ethylene, or copolymerizing ethylene with an alpha-olefin, using a catalyst comprising a reaction product between a magnesium compound and a titanium halide and an organoaluminum compound; wherein the following three polymerization steps, (a) a step of forming an ethylene polymer of copolymer having an alpha-olefin content of not more than 10% by weight and an intrinsic viscosity [$\eta$] of 0.3 to 1.5, (b) a step of forming an ethylene polymer or copolymer having an alpha-olefin content of not more than 30% by weight and an intrinsic viscosity [$\eta$] of 1.5 to 7, and (c) a step of forming an ethylene polymer or copolymer having an alpha-olefin content of not more than 30% by weight and an intrinsic viscosity [$\eta$] of 7 to 40, are carried out in any desired sequence, and the polymerization reactions are carried out while adjusting the ratio of the amounts of the polymers formed in step (a):step (b):step (c) to 1:0.1–1.5:0.01–1.2.

Japanese Laid-Open Patent Publication No. 8713/1983 discloses a process for producing an ethylenic copolymer which comprises copolymerizing ethylene and an alpha-olefin using a catalyst system obtained from (A) a solid catalyst component containing at least magnesium, halogen and titanium atoms and (B) an organoaluminum compound in at least two steps, wherein (1) in at least one step, 80 to 20 parts by weight of a copolymer having a high-load melt index of 0.03 to 10 g/10 min. and a density of 0.890 g/cm$^3$ to less than 0.905 g/cm$^3$ is produced, (2) in a second step, 20 to 80 parts by weight of a copolymer having a melt index of 10 to 5000 g/min. 10 min. and a density of 0.905 to 0.940 g/cm$^3$ is produced, whereby a copolymer having a melt index of 0.02 to 30 g/10 min. and a density of 0.890 to 0.935 g/cm$^3$ is produced.

This patent document discloses that the high-load melt index was measured at a temperature of 190° C. under a load of 21.6 kg in accordance with JIS K-6760.

Japanese Laid-Open Patent Publication No. 8712/1983 discloses a process for producing an ethylenic copolymer using the same catalyst as described in the above-cited Japanese Laid-Open Patent Publication No. 8713/1983 by multi step polymerization, wherein (1) in at least one step, 80 to 20 parts by weight of a copolymer of ethylene with propylene and/or butene-1 having a highload melt index of 0.03 to 10 g/10 min. and a density of 0.890 to 0.935 g/cm$^3$ is produced and (2) in at least one other step, 20 to 80 parts by weight of a copolymer of ethylene and an alpha-olefin having at most 12 carbon atoms as a comonomer having a melt index of 10 to 5000 g/10 min. and a density of 0.890 to 0.940 is produced, said alpha-olefin containing at least 30 mole % of alphaolefins having 5 to 12 carbon atoms, whereby a copolymer having a melt index of 0.02 to 30 g/10 min. and a density of 0.890 to 0.936 g/cm$^3$ is produced.

Japanese Laid-Open Patent Publication No. 120,605/1984 discloses a process for producing an ultrahigh molecular-weight polyethylene resin with improved moldability and processability, which comprises polymerizing monomers using a Ziegler-type catalyst comprising a solid catalyst component containing a trasition metal ingredient and an organometallic catalyst component in at least two steps having different monomer compositions and hydrogen concentrations; wherein in at least one step, propylene or monomers mainly comprising propylene, or butene-1 or monomers mainly comprising butene-1 are polymerized in the presence of hydrogen to produce 2 to 60% by weight, based on the entire polymer to be produced, of a polypropylene or polybutene-1 component, and in at least one remaining step, ethylene or monomers mainly comprisig ethylene are polymerized in the substantial absence of hydrogen to produce 98 to 40% by weight, based on the entire polymer produced, of an ultrahigh-molecular-weight polyethylene component.

British Patent No. 1,174,542 discloses a process for the preparation of a homo- or co-polymer of ethylene by a gaseous phase polymerization, or by a suspension polymerization in which the dispersion medium is in contact with a gaseous phase, of ethylene or a mixture comprising ethylene and up to 10% by weight of an alpha-olefin that contains from 3 to 15 carbon atoms, which process comprises preparing from 5 to 30% by weight of the total polymer in the presence of from 0 to 10% of hydrogen, calculated on the total volume of the gaseous phase, and preparing from 70 to 95% by weight of the total polymer in the presence of from 20 to 80% of hydrogen, calculated on the total volume of the gaseous phase, both stages of the polymerization being carried out at a temperatur within the range of from 50° to 120° C. and a pressure of up to 10 atmospheres gauge, in the presence of a catalyst which is present in the first stage in an amount sufficient for both stages, said catalyst comprising (a) in the case of a suspension polymerization, from 0.05 to 3.0 millimol per liter of dispersion medium, or in the case of a polymerization in the gaseous phase, from 0.05 to 0.3 millimol per 0.5 liter of reactor volume, of a trivalent titanium compound that contains chlorine, and (b) from 0.1 to 3.0 millimols of aluminum per liter of dispersion medium or reactor volume, in the form of an aluminum trialkyl having the general formula $AlR_3$, in which each R represents a hydrocarbon radical that contains from 4 to 40 carbon atoms, or in the form of the reaction product of an aluminum trialkyl or an aluminium alkyl hydride with a diolefin that contains from 4 to 20 carbon atoms.

Japanese Laid-Open Patent Publication No. 275,313/1986 discloses an ultrahigh-molecular-weight polyethylene composition having improved injection-moldability which has an intrinsic viscosity, determined in decalin at 135° C., of 10 to 30 dl/g and obtained by polymerization reaction in at least two steps mentioned below.

(First step)

A step of forming 50 to 99.5 parts by weight of polyethylene having an intrinsic viscosity, determined in decalin at 135° C., of 12 to 32 dl/g by polymerizing ethylene in the absence of hydrogen or in a lowered hydrogen concentration with a catalyst comprisig a solid catalyst component containing at least Mg, Ti and/or V and an organometallic compound.

(Second step)

A step of forming 50 to 0.5 parts by weight of polyethylene by polymerizing ethylene in a hydogen concentration increased over that in the first step.

Likewise, European Laid-Open Patent Publication No. 0186995 discloses a process for producing ultrahigh-molecular-weight polyethylene having an intrinsic viscosity, determined in decalin at 135° C., of 10 to 30 dl/g by polymerization in at least two steps, which comprises (a) a first step of forming 70 to 99.5 parts by weight of polyethylene having an intrinsic viscosity, determined in decalin at 135° C. of 12 to 32 dl/g by polymerizing ethylene monomer in the absence of hydrogen or in the presence of hydrogen in a low concentration using a combination catalyst comprising a solid component containing at least magnesium, titanium and/or vanadium and an arganometallic compound, and (b) a second step of forming 30 to 0.5 parts by weight of polyethylene having an intrinsic viscosity, determined in decalin at 135° C., of 0.1 to 5 dl/g by polymerizing a freshly fed ethylene monomer in the resence of hydrogen in a high concentration.

SUMMARY OF THE INVENTION

The present invention aims at providing a polyolefin composition having excellent melt moldability without impairing the mechanical properties inherently possessed by ultrahigh-molecular-weight polyolefins, such as impact resistance, wear resistance, chemical resistance, tensile strength and the like.

The present invention aims at providing, in particular, a polyolefin composition having a significantly reduced dynamic friction coefficient, significantly improved sliding property (sliding property is important for a sliding material which is a major application of ultra-high-molecular weight polyolefins) and good surface gloss when molded into a molded article.

In the present invention, the above object and advantages of the present invention can be achieved by a polyolefin composition characterized in that (1) the composition consists substantially of an ultrahigh-molecular-weight polyolefin having an intrinsic viscosity of 10–40 fl/g as measured in decalin of 135° C. and a low-molecular-weight to high-molecular-weight polyolefin having an intrinsic viscosity of 0.1–5 dl/g as measured in decalin of 135° C.

(2) the ultrahigh-molecular-weight polyolefin is contained in the composition in an amount of 10–40% by weight based on the total weight of the ultrahigh-molecular-weight polyolefin and the low-molecular-weight to high-molecular weight polyolefin, (3) the composition has an intrinsic viscosity $[\eta]c$ of 3.5–15 dl/g as measured indecalin of 135° C., (4) the composition has a melt torque T of 4.5 kg.cm or below, and (5) the section of the injection-molded square plate produced from the composition has a phase-separated structure composed of a continuous phase and a discontinuous phase (Hereinafter this structure may be called as "sea-island structure", and the continuous phase as "seaportion" and the discontinuous phase as "island portion".) and the average particle diameter (averge major axis length) of the discontinuous phase is 20 $\mu$m or below.

The other objects and advantages of the present invention will become apparent from the following description.

DETAILED DESCRIPTION OF THE PREFERRED EMBODIMENTS

In view of the above mentioned problems of the prior art, the present inventors made further study and, by further specifying the technique of Japanese patent application No. 156168/1986, that is, by paying attention to the dispersibility of a plurality of components having different molecular weights, fround a polyolefin composition with improved moldability and improved slidability (slidability is a very important property of ultrahigh-molecular-weight polyolefins).

The ultrahigh-molecular-weight polyolefin referred to in the present invention has an intrinsic viscosity $[\eta]u$ as measured in decalin of 135° C., of 10–40 dl/g, preferably 15–35 dl/g. Polyolefins having an $[\eta]u$ of less than 10 dl/g tend to have poor mechanical properties when made into an injection-molded article. Those having an $[\eta]u$ of more than 40 dl/g have poor appearance and flow marks and cause delamination, when made into an injection-molded article.

The low-molecular-weight to high-molecular-weight polyolefin referred to in the present invention has an $[\eta]h$ as measured in decalin of 135° C., of 1.1–5 dl/g, preferably 0.5–3 dl/g. Polyolefins having an $[\eta]h$ of less than 0.1 dl/g may cause bleeding at the surface of the injection-molded article, owing to the too low molecular weight. Those having an $[\eta]h$ of more than 5 dl/g have low melt-flowability, making it difficult to use a general-purpose polyethylene injection molding mahcine as it is.

The polyolefins in the present invention are homopolymers or copolymers of α-olefins such as ethylene, propylene, 1-butene, 1-pentene, 1-hexene, 1-octene, 1-decene, 1-dodecene, 4-methyl-1-penetene, 3-methyl-1-pentene and the like. Preferred are an ethylene homopolymer and an ethylene-α-olefin copolymer using ethylene as a main component.

The proportions of the ultrahigh-molecular-weight polyolefin and the low-molecular-weight to high-molecular-weight polyolefin are such that the amount of the ultrahigh-molecular-weight polyolefin is 10–40% by weight based on the total weight of the two polyolefins, in other words, the amount of the low-molecular-weight to high-molecular-weight polyolefin is 85–60% by weight of the total weight of the two polyolefins. Preferably proportions are such that the amount of the ultrahigh-molecular-weight polyolefin is 15–35% by weight based on the total weight of the two polyolefins. Compositions in which the ultrahigh-molecular-weight polyolefin is contained in an anount of less than 10% by weight tend to have poor mechanical properties when made into an injection-molded article. When the amount of the ultrahigh-molecular-weight polyolefin is more than 40% by weight, the injection-molded article gives rise to delamination, making it difficult to obtain a molded article with good mechanical properties.

The injection-molding polyolefin composition of the present invention consists substantially of the ultrahigh-molecular-weight polyolefin and the low-molecular-weight to high-molecular-weight polyolefin of te above proportions. Further, the injection-molding polyolefin composition of the present invention has an intrinsic viscosity $[\eta]c$ of 3.5–15 dl/g as measured in decalin of 135° C. and a melt torque T of 4.5 kg.cm or below. The melt torque T is a value measured under conditions of temperature=240° C., pressure=5 kg/cm², vibrational amplitude=3º and number of vibration =6 CPM using a JSR curastometer (product of Imanaka Kikai Kogyo K.K.).

When the polyolefin composition has an $[\eta]c$ of less than 3.5 dl/g, the injection-molded article prduced therefrom may have poor mechanical strengths, particularly poor abrasion resistance. When the polyolefin composition has an $[\eta]c$ of more than 15 dl/g, the injection-molded article produced therefrom has delamination and, as a result, has reduced mechanical strengths such as low abrasion resistance.

When the polyolefin composition has a melt torque T of more than 4.5 kg.cm, it is difficlt to feed the resin into an ordinary screw and injection molding of the polyolefin composition by a general-purpose injection-molding machine is impossible.

The injection-molding polyolefin composition of the present invention has an intrinsic viscosity [ ]c of preferably 4.0–10 dl/g.

The injection-molding polyolefin composition of the present invention can be prepared even by compounding the ultrahigh-molecular-weight polyolefin and the low-molecular-weight to high-molecular-weight polyolefin in the above mentioned proportions. However, it has been found that the present polyolefin composition can be prepared advantageously according to a multi-step polymerization process (to be described later) wherein an olefin is polymerized in multi-steps in the presence of a catalyst formed by a specific solid titanium catalyst component of high activity and an organoaluminum compound catalyst component. The multi-step polymerization process is effected by polymerizing an olefin in multi-steps in the presence of a Ziegler-type catalyst formed by (A) a highly active titanium catalyst component containing magnesium, titanium and a halogen as essential elements and (B) an organoaluminum compound catalyst component. That is, an ultrahigh-molecular-weight polyolefin having an intrinsic viscosity of 10–40 dl/g is formed in at least one polymerization step, and in other polymerization step, an olefin is polymerized in the presence of hydrogen to form a low-molecular-weight to high-molecular-weight polyolefin having an intrinsic viscosity of 0.1–5 dl/g.

The specific Ziegler-type catalyst used in the above process is basically formed by a solid titanium catalyst component and an organoaluminum compound catalyst component and has specific properties. The solid titanium catalyst component is preferably a high active catalyst which requires no removal procedure after polymerization, and usually contains magnesium, a halogen and titanium as essential elements. It is required in the present invention that a plurality of polyolefin components of different molecular weights be finely dispersed in the polyolefin composition when the composition is injection-molded into a square plate and that in order to obtain such fine dispersion, the polymer particles have a particle diameter as mentioned later and be present preferably as an agglomerate of amorphous fine particles and not as tight spherical or granular particles.

In order to obtain polymer particles as mentioned above, there can be used, for example, a solid titanium catalyst component as mentioned below.

That is, there can be used, for example, a titanium catalyst component prepared by, in caccordance with the method described in Japanese Patent Publication No. 32270/1975, reacting magnesium chloride with an electron donor and an organoaluminum or an organozinc in this order and then with a titanium compound, or a titanium catalyst component prepared by in accordance with the method described in Japanese Patent Publication No. 1796/1987, reacting magnesium chloride with an electron donor and a silicon halide in this order and then with a titanium compound. Also, there can preferably be used a catalyst component obtained by subjecting the above catalyst component to physical grinding. Thus, there can be obtained a solid catalyst component which is satisfactory in both polymerization activity and particle properties. Such a catalyst component contains titanium in an amount of about 1–10% by weight and has a halogen/titanium atomic ratio of about 5–90 and a magnesium/titanium atomic ratio of about 4–50. This solid catalyst component has also a specific surface area of 3–1,000 m²/g, preferably 30–500 m² /g, especially preferably 100–300 m²/g. The catalyst component has an average particle diameter of preferably 20 μm or below, more preferably 10–1 μm.

In order to finely disperse a plurality of polyolefin components of different molecular weights in the polyolefin composition of the preent invention, it is preferable that the polymer particles of these components have some range in the particle diameter distribution. In order to achieve it, it is preferable that the catalyst also have some range in the particle diameter distribution. It is preferable to use, for example, such a catalyst as to enable the production of polymer particles whose geometrical standard deviation of diameter is 1.4 or above.

The injection-molding polyolefin compositioin of the present invention can be produced by slurry-polymerizing an olefin in a multi-step (at least two-step) polymerization process in a hydrocarbon medium such as pentane, hexane, heptane, kerosene or the like ordinarily at a temperature of 0°–100° C. using a highly active titanium catalyst component of fine powder state as mentioned above, an organoaluminum compound catalyst component and, as necessary, an electron donor. As the organoaluminum compound catalyst component, there can be preferably used, for example, a trialkylaluminum such as triethylaluminum, triisobutylaluminum or like, a dialkylaluminum chloride such as diethylaluminum chloride, diisobutylaluminum chloride or the like, an alkylaluminum sesquichloride such as ethylaluminum sesquichloride or the like, or their mixture.

In the multi-step polymerization of an olefin, there are used multi-step polymerization apparatuses consisting of at least two polymerization tanks ordinarily connected in series, and there is effected, for example, a two-step polymerization process, a three-step polymerization process, ... or a n-step polymerization process. It is also possible to effect a multi-step polymerization process in a single polymerization tank and in batchwise polymerization. In the multi-step polymerization process, it is necessary that an ultrahigh-molecular-weight polyolefin of a particular amount be produced in at least one polymerization tank. The production of such an ultrahigh-molecular-weight polyolefin can be in the first polymerization step, or in the intermediate polymerization step, or in two or more polymerization steps. The production of an ultrahigh-molecular-weight polyolefin in the first polymerization step is preferable in view of the control of polymerization procedure and properties of polymer produced. In the polymerization step for producing an ultrahigh-molecular-weight polyolefin, it is necessary to polymerize 10–40% by weight of the total olefin to be polymerized in all the steps and thereby to produce an ultrahigh-molecular-weight polyolefin having an intrinsic viscosity $[\eta]u$ as measured in decalin at 135° C., of 10–40 dl/g. It is preferable to polymerize 18–37% by weight, especially 21–35% by weight of the total olefin to be polymerized in all the steps and thereby to produce an ultrahigh-molecular-weight polyolefin having an intrinsic viscosity $[\eta]u$ of 15–±dl/g, especially 18–30 dl/g.

In the polymerization step for producing an ultrahigh-molecular-weight polyolefin, polymerization is effected in the presence of a catalyst composed of (A) a highly active titanium catalyst component as mentioned above and (B) an organoaluminum compound catalyst component as mentioned above. The polymerization can be vapor phase polymerization or liquid phase polymerization. In any polymerization for producing an ultrahigh-molecular-weight polyolefin, an inert medium is used as necessary. For example, vapor phase polymerization is effected in the presence of a diluent consisting of an inert medium, as necessary, and liquid phase polymerization is effected in the presence of a solvent consisting of an inert medium, as necessary.

In the polymerization step for producing an ultrahigh-molecular-weight polyolefin, it is preferable to use, as the catalyst, the highly active titanium catalyst component (A) in an anount of, for example, about 0.001–20 mg atom (as titanium atom), preferably about 0.005–10 mg atom per liter of medium and the organoaluminum compound catalyst component (B) in an amout of about 0.1–1,000, preferably about 1–500 as Al/Ti atomic ratio. The temperature employed in the polymerization step for producing an ultrahigh-molecular-weight polyolefin olefin is ordinarily about $-20°$ C., to about 120° C., preferably about 0°–100° C., especially preferably about 5°–95° C. The pressure employed in the polymerization step is such as to enable liquid phase polymerization or vapor phase polymerization at the above polymerization temperature and is, for example, atmospheric pressure to about 100 kg/cm$^2$, preferably atmospheric pressure to about 50 kg/cm$^2$. The time employed in the polymerization step can be set so that the amount of the ultrahigh-molecular-weight polyolefin produced becomes about 1,000 g or more, preferably about 2,000 g or more per 1 mg atom of titanium in the highly active titanium catalyst component. In the polymerization step for producing an ultrahigh-molecular-weight polyolefin, the polymerization reaction is effected preferably in the absence of hydrogen. After the polymerization reaction, it is possible to isolate the produced polymer in an iner medium atmosphere and to store it.

As the inert medium usable inthe polymerization step for producing an ultrahigh-molecular-weight polyolefin, there can be mentioned, for example, an aliphatic hydrocarbon such as propane, butane, pentane, hexane, heptane, octane, decane, kerosene or the ike, an alicyclic hydrocarbon such as cyclopetane, cyclohexane or the like, an aromatic hydrocarbon such as benzene, toluene, xylene or the like, a halogenated hydrocarbon such as dichloroethane, methylene chloride, chlorobenzene or the like, or their mixture. The use of an aliphatic hydrocarbon is preferred particularly.

In the polymerization step of the present process, other than the polymerization step for producing an ultrahigh-molecular-weight polyolefin, that is, the polymerization step for producing a low-molecular-weight to high-molecular-weight polyolefin, the polymerization reaction of the remaining olefin is effected in the presence of hydrogen. When the polymerization step for producing an ultrahigh-molecular-weight polyolefin is the first polymerization step, the second and later polymerization steps become the polymerization step for producing a low-molecular-weight to high-molecular-weight polyolefin. Polymerization can be effected continuously. At that time, an olefin and hydrogen are fed into the polymerization step for producing an low-molecular-weight to high-molecular-weight polyolefin. When the polymerization step for producing a low-molecular-weight to high-molecular-weight polyolefin is a first polymerization step, a catalyst composed of a highly active titanium catalyst component (A) and an organozluminum compound catalyst component (B) is fed into the polymerization step; when the polymerization step is second and later steps, the catalyst contained in the reaction mixture obtained in the first polymerization step can be used as it is, or the same fresh catalyst added in the first polymerization step may be supplemented as necessary but in this case the addition of a large amount of the titanium catalyst component (A) is not preferable. The proportion of the olefin to be polymerized in the polymerization step for producing a low-molecular-weight to high-molecular-weight polyolefin is 5–70% by weight, preferably 20–60% by weight, especially preferably 25–55% by weight based on the weight of the total olefin to be polymerized in all the polymerization steps.

The proportion of hydrogen fed to the polymerization step for producing a low-molecular-weight to high-molecular-weight polyolefin is ordinarily 0.01–50 moles, preferably 0.05–30 moles per mole of olefin to be fed into the polymerization step.

In the polymerization step for producing a low-molecular-weight to high-molecular-weight polyolefin, the concentration of each catalyst component in the reaction mixture in the polymerization tank is preferably controlled so that titanium is present in an amount of about 0.001–0.1 mg atom, preferably about 0.005–01 mg atom per liter of polymerization capacity and Al/Ti atomic ratio in the polymerization system is about 1–1,000, preferably about 2–500. Therefore, the organoaluminum compound catalyst component (B) can be added as necessary. In the polymerization system, there may be present together hydrogen, an electron donor, a halogenated hydrocarbon, etc. in order to control the molecular weight, molecular weight distribution, etc. of a polyolefin to be produced.

The polymerization temperature is selected so as to enable slurry polymerization or vapor phase polymerization and is preferably about 40° C. or above, more preferably about 50°–100° C. The polymerization pressure is recommendably, for example, atmospheric ressure to about 100 kg/cm$^2$, especially atmospheric pressure to about 50 kg/cm$^2$. The polymerization time is set so that the amount of polymer produced is preferably about 1,000 g or more, especially preferably about 5,000 g or more per 1 mg atom (titanium atom) in titanium catalyst component.

The polymerization step for producing a low-molecular-weight to high-molecular-weight polyolefin can be effected according to a vapor phase polymerization method or a liquid phase polymerization method. It is possible of course to employ a different polymerization method in each polymerization step for producing a low-molecular-weight to high-molecular-weight polyolefin. With respect to the liquid phase polymerization method, a slurry suspension polymerization method is employed preferably. In any polymerization method, the polymerization reaction is effected ordinarily in the presence of an inert medium. For example, in a vapor phase polymerizatioin method, the reaction is effected in the presence of an inert medium as a diluent; in the liquid phase slurry suspension polymerization method, the reaction is effected in the presence of an inert medium as a solvent. As the inert medium, there can be mentioned, for example, the same inert media as mentioned with respect to the polymerization step for producing an ultrahigh-molecular-weight polyolefin.

The polymerization reaction is effected so that the polyolefin composition obtained in the final polymerization step has an intrinsic viscosity $[\eta]c$ of ordinarily 3.5–15 dl/g, preferably 4.0–10 dl/g and a melt torque T of 4.5 kg.cm or below.

The above mentioned multi-step polymerization process can be effected batchwise, semicontinuously or continuously.

As the olefin to which the multi-step polymerization process of the present invention can be applied, there can be mentioned, for example, $\alpha$-olefins such as ethylene, propylene, 1-butene, 1-pentene, 1-hexene, 1-octene, 1-decene, 1-dodecene, 4-methyl-1-pentene 3-methyl-1-pentene and the like. These olefins can be used alone for the production of a homopolymer, or in combination of two or more for the production of a copolymer. The present process is preferably utilized for the production of an ethylene homopolymer or an ethylene-$\alpha$-olefin copolymer containing ethylene as a main component.

The polyolefin composition obtained in the final polymerization ste, when it is injection-molded into a square plate and its section is examined, has a sea-island structure and the island portion has an average particle diameter (average major axis length) of 20 $\mu$m or below.

The injection molding conditions for making a square plate for the measurement of the above particle diameter are as follows.

Molding machine: Tohsiba IS-50

Die: 130 mm×120 mm×2 mm (thickness) square plate (gate: side pin gate, one point)

Injection temperature: nozzle/front/middle/rear =245° C./245° C./240° C./210° C.

Injection pressure: primary/secondary =800 kg/cm$^2$/600 kg/m$^2$

Injection time: injection/pressure holding-/cooling=5 sec/13 sec/15 sec

Injection speed: 2/10

Die cooling: water-cooled (25° C.)

The average particle diameter (average major axis length) of the island portion can be obtained by cutting the injection-molded square plate in the injection axis direction to obtain a section, taking a micrograph of the section, randomly selecting, in the micrograph, at least 20 islands in the sea-island structure of the section, measuring the major axis length of each of at least 20 islands selected and calculating the average of the lengths.

In order to achieve the objects of the present invention, the average particle diameter (average major axis length) of the discontinuous phase is 20 $\mu$m or below, preferably 15 $\mu$m or below, especially referably 10–0.1 $\mu$m.

It is generally thought that the discontinuous phase consists of an ultrahigh-molecular-weight polyolefin and the continuous phase consists of a low-molecular-weight to high-molecular-weight polyolefin. The small particle diameter of the discontinuous phase indicates a state that a plurality of polyolefin components of different molecular weights are finely dispersed and, as a result, the polyolefin composition has a reduced dynamic friction coefficient and improved slidability. When the discontinuous phase has a small particle diameter, the particles of the ultrahigh-molecular-weight polyolefin ate small and accordingly the product produced from the polyolefin composition has improved appearance.

Meanwhile, the polyolefin composition of the present invention produced accoring to the multi-step polymerization process is obtained ordinarily in a powdery state and the powder has an average particle diameter of ordinarily about 50–500 $\mu$m, preferably about 100–400 $\mu$m, especially preferably 150–300 $\mu$m. When the powder has such a particle diameter, the plurality of components of different molecular weights in the polyolefin composition are finely dispersed.

The polyolefin composition of the present invention can be made into various molded articles according to a known melt-molding method.

The polyolefin composition of the present invention can contain compounding agents ordinarily added to polyolefins, such as heat stabilizer, weathering stabilizer, pigment, dye, lubricant, inorganic fillers or reinforcing agents (e.g. carbon black, talc, glass fiber), flame retardant, neutron-shielding agent and the like, in such amount that the objects of the present invention are not impaired.

The polyolefin composition of the present invention has excellent melt moldability without sacrifycing excellent properties (e.g. impact resistance, abrasion resistance, chemical resistance, tensile strength) inherently possessed by ultrahigh-molecular-weight polyolefins. The present polyolefin composition has, in particular, significantly reduced dynamic friction coefficient and accordingly has significantly improved sliding property (this sliding property is very important for a sliding material which is a major application of ultrahigh-molecular-weight polyolefins).

The present polyolefin composition can be extrusion-molded at a low load and a low resin pressure to easily obtain, for example, round rods of 20–200 mm in diameter and profiles of complicated section. The present polyolefin composition can also be compression-molded to easily obtain thin sheets of 2–5 mm in thickness.

The present invention is illustrated specifically below by way of Examples. However, the present invention is in no way restricted to these Examples unless the present invention deviates from its scope.

The inherent viscosity [η]h of the low-molecular-weight to high-molecular-weight polyethylene in the polyethylene composition obtained in the following Example was calculated according to the following method.

(1) The density du of an ultrahigh-molecular-weight polyethylene and the density dc of a final polyethylene composition are mesured. The density dh of a low-molecular-weight to high-molecular-weight polyethylene is calculated from the following formula.

$$\frac{a}{du} + \frac{b}{dh} = \frac{1}{dc}$$

wherein dh, dc and du are defined as above, and a and b are proportions by weight of the ultrahigh-molecular-weight polyethylene and the low-molecular-weight to high-molecular-weight polyethylene, respectively, in the final polyethylene composition.

(2) Various low-molecular-weight to high-molecular-weight polyethlenes having different intrinsic viscosities are produced under substantially the same polymerization conditions (monomer composition, catalyst, etc.) as in the production of the low-molecular-weight to high-molecular-weight polyethylene having a density dh, except that different hydrogen partial pressures are used. On the resulting polyethylenes, there is obtained a relationship between intrinsic viscosity [η] and density.

The density dh obtained in the above (1), of the low-molecular-weight to high-molecular-weight polyethlene in the polyethylene composition of the present invention is applied to the above relationship between intrinsic viscosity and density to obtain an intrinsic viscosity [η]h of the polyethylene.

(3) The density of each sample is determined according to the following method. An aluminum plate (3×300×300), an asbestos plate (5×250×250), a stainless steel plate (3×200×220) and a polyester film are piled up in this order. This combination of three plates and one film are prepared in two sets. One set is palced on the pressing surface of a press-molding machine so that the polyester film is at the top. Thereon is palced a metal frame for molding (2×200×200). Further thereon is placed the other set so that the polyester film is at the bottom.

A sample is charged into the metal frame and melted at 190° C. for 8 minutes with no pressure applied. Then, the sample is molded for 5 minutes at a pressure of 300 kg/cm². Thereafter, the sample is cooled to 60° C. at a cooling rate of 15°±2° C./min and taken out form the metal frame. The sample is kept in a constant temperature bath of 120°±0.2° C. for 1 hour and then cooled to room temperature in 1 hour at a cooling rate of 1.5° C./min. After the cooling, the sample is taken out and is allowed to stand for 1 hour at room temperature. Then, the sample is measured for density according to the density gradient method (ASTM 1505).

EXAMPLE 1

Preparation of catalyst 4.0 liters of purified hexane and 95 g of anhydrous magnesium chloride were fed into a 10-liter reactor with a stirrer, thoroughly purged with nitrogen. 350 ml of ethanol was dropwise added thereto in two hours at room temperature with stirring and then stirring was effected for about 1 hour at room temperature. Next, 330 ml of diethylaluminum chloride was dropwise added in 2 hours, after which stirring was effected for about 1 hour at room temperature. Then, 1.3 liters of titanium tetrachloride was dropwise added in 1 hour and a reaction was effected for 1 hour at 80° C.

After the completion of the reaction, the solid portion was separated by filtering. The solid portion was washed with purified hexane two times to obtain a solid titanium catalyst component. The titanium catalyst component contained 6.8% by weight of titanium, 15% by weight of mangesium and 60% by weight of chlorine.

The observation of the solid catalyst component by an optical microscope of 390 magnification showed that the catalyst component is an agglomerate of fine soid particles of about 1 μm in diameter in plurality of layers.

Polymerization 12 liters of purified n-decane was placed in a 24-liter autoclave thoroughly purged with nitrogen and heated to 50° C. At the same temperature there were added 12 mM of triethylaliminum and 0.12 mM (as titanium atom) of the titanium catalyst component obtained in the above. The catalyst inlet of the autoave was closed and ethylene was introduced so that the internal pressure of the autoclave became 4 kg/cm²G, to effect a first step polymerization. The polymerization temperature was kept at 47°–48° C. In 44 minutes after the ehtylene introduction, the internal pressure was quickly reduced and, when the pressure became atmospheric pressure, hydrogen was introduced to a pressure of 6.8 kg/cm²G and then ethylene were introduced so that the total internal pressure became 8 kg/cm²G. Simultaneously, the polymerization temperature was increased to 80° C. to effect a second step polymerization The polymerization time in the second step was 6 hours and 10 minutes. After the completion of the polymerization, the temperature of the autoclave inside was decreased and a solid white polymer was separated and dried. The polymer yield was about 3.6 kg and the polymer had an intrinsicviscosity of 5.9 dl/g. The average particle diameter ofthe polymer as measured after sieving was 230 μm.

Meanwhile, the polymer obtained by separately effecting only the first step gave 710 g and had an intrinsic viscosity of 27.0 dl/g. Therefore, the low-molecular-weight polyethylene formed in the second step had an intrinsic viscosity of 0.72 dl/g and the content of the ultrahigh-molecular-weight polyethylene was 20% by weight.

The [η] of each component of the polyolefin composition obtained and the [η] and melt torque T of the polyolefin composition were measured according to the following methods. [η]: Measured in decalin at 135° C. Melt torque (T): A stress torque of a molten sample was measured using a JSR curastometer (product of Imagawa Kikai Kogyo) under conditions of temperature=240° C., pressure=5 kg/cm², vibrational amplitude=±3°and number of vibration=6 CPM.

Injection molding 100 parts by weight of the above obtained polyethylene composition was mixed with 0.1 part by weight of tetrakis(methylene(3,5-di-tert-butyl-4-hydroxy)hydrocinnamate)methane (IRGANOX 1010, product of Ciba Geigy Japan Limited), 0.1 part by weight of tetrakis(2,4-di-tert-butylphenyl)-4,4-biphenylene diphosphite (SANDOSTAB P-EQP, product of SANDOZ) and 0.12 part by weight of calcium stearate (product of NIPPON OIL & FATS CO, LTD.) by a Henschel mixer. The mixture was injection molded by an injection-molding machine (IS-50, product of TOSHIBA CORP.) under the following conditions to obtain a square plate (130 mm±120 mm×2 mm). The plate was cut to prepare test pieces.

Injection molding conditions:
Cylinder temperature (°C.): 200/230/270/270
Injection pressure (kg/cm²): primary/secondary=1000/800
Cycle (sec): primary/secondary/cooling=5/3/2/5
Injection speed (−): 2/10
Screw rotation (r.p.m.): 97
Die temperature (°C.): water-cooled (32° C.)

The properties of the sample were measured according to the following methods.

Tensile test: ASTM 638 was used. However, the sample of test piece was ASTM No. 4 and the tensile speed was 50 mm/min. There were measured yield streee (YS: kg/cm²), tensile strength at break (TS: kg/cm²) and elongation at break (EL: %).

Izod impact strength (kg.cm/cm): Measured according to ASTM D 256 using a notched sample.

Olsen rigidity (kg/cm²): Measured according to ASTM D 747.

Frictional abrasion test: Conducted for 24 hours using a Matsurbara frictional abrasion tester (product of Toyo Baldwin) under a compression load of 3.4 kg/cm² at a sliding speed of 30 m/min to measure abrasionloss and friction coefficient.

Gloss: Measured according to ASTM D 523 at a light incident angle of 45° C.

TABLE 1

| Polyolefin composition | |
|---|---|
|  | Example 1 |
| Ultrahigh-molecular-weight polyolefin [η]u | 27.0 |
| Low-molecular-weight to high-molecular-weight polyolefin [η]h | 0.72 |

TABLE 1-continued

| Polyolefin composition | |
|---|---|
|  | Example 1 |
| Properties of polyolefin composition |  |
| Content of ultrahigh-molecular-weight polyolefin (% by weight) | 20 |
| Content of low-molecular-weight polyolefin (% by weight) | 80 |
| [η]c (dl/g) | 5.9 |
| Melt torque T (kg · cm) | 1.4 |
| Tensile test |  |
| (YS) (kg/cm²) | — |
| (TS) (kg/cm²) | 740 |
| (EL) (%) | 6 |
| Izod impact strength (kg · cm/cm) | 10 |
| Olsen rigity (kg/cm²) | 13,000 |
| Friction coefficient (μ) | 0.10 |
| Abrasion loss (mg) | 0.2 |
| Gloss (%) | 95 |
| Average major asix length of discontinuous phase (μm) | 3 |

What is claimed is:

1. A polyolefin composition characterized in that
   (1) the composition consists substantially of an ultrahigh-molecular-weight polyolefin having an intrinsic viscosity of 10–40 dl/g as measured in decalin at 135° C. and a low-molecular-weight to high-molecular-weight polyolefin having an intrinsic viscosity of 0.1–5 dl/g as measured in decalin at 135° C.
   (2) the ultrahigh-molecular-weight polyolefin is contained in the composition in an amount of 10–40% by weight based on the total weight of the ultrahigh-molecular-weight polyolefin and the low-molecular-weight to high-molecular-weight polyolefin,
   (3) the composition has an intrinsic viscosity [η] of 3.5–15 dl/g as measured in decalin at 135 °C.,
   (4) the composition has a melt torque T of 4.5 kg.cm or below, and
   (5) a section of an injection-molded square plate produced from the composition has a phase-separated structure composed of a continuous phase and a discontinuous phase and the average particle diameter, measured as average major axis length of the discontinuous phase is 20 μm or below.

2. The polyolefin composition set forth in claim 1, wherein the ultrahigh-molecular-weight polyolefin and the low-molecular-weight to high-molecular-weight polyolefin are produced in a multi-step polymerization process wherein an olefin is polymerized in at least one polymerization step in the presence of a Ziegler-type catalyst formed by (A) a highly active titanium catalyst component containing magnesium, titanium and a halogen as essential elements and (B) an organoaluminum compound catalyst component to produce an ultrahigh-molecular-weight polyolefin having an intrinsic viscosity of 10–40 dl/g and, in another polymerization step, an olefin is polymerized in the presence of hydrogen to produce a low-molecular-weight to high-molecular-weight polyolefin having an intrinsic viscosity of 0.1–5 dl/g.

3. The olefin composition set forth in claim 1, wherein
   (1) the composition consists substantially of an ultrahigh-molecular-weight polyolefin having an intrinsic viscosity of 15–35 dl/g as measured in decalin at 135° C. and a low-molecular-weight to high-molecular-weight polyolefin having an intrinsic viscosity of 0.3–3 dl/g as measured in decalin at 135° C., (2) the ultrahigh-molecular-weight polyolefin is contained in the composition in an amount of 15–35% by weight based on the total weight of the ultrahigh-molecular-weight polyolefin and the low-molecular-weight to high-molecular-weight polyolefin, (3) the composition has an intrinsic viscosity $[\eta]$ of 4.0–10 dl/g as measured in decalin of 135° C., (4) the composition has a melt torque T of 4.5 kg.cm or below, and (5) a section of an injection-molded square plate produced from the composition has a phase-separated structure composed of a continuous phase and a discontinuous phase and the average particle diameter, measured as average major axis length, of the discontinuous phase is 15 μm or below.

4. The polyolefin composition set forth in claim 3, wherein the ultrahigh-molecular-weight polyolefin and the low-molecular-weight to high-molecular-weight polyolefin are produced in a multi-step polymerization process wherein an olefin is polymerized in at least one polymerization step in the presence of a Ziegler-type catalyst formed by (A) a highly active titanium catalyst component containing magnesium, titanium and halogen as essential elements and (B) an organoaluminum compound catalyst component to produce an ultrahigh-molecular-weight polyolefin having an intrinsic viscosity of 15–35 dl/g and, in another polymerization step, an olefin is polymerized in the presence of hydrogen to produce a low-molecular-weight to high-molecular-weight polyolefin having an intrinsic viscosity of 0.5–3 dl/g.

5. The polyolefin composition set forth in claim 3, wherein (1) the composition consists substantially of an ultrahigh-molecular-weight polyethylene having an intrinsic viscosity of 15–35 dl/g as measured in decalin at 135° C. and a low-molecular-weight to high-molecular-weight polyethylene having an intrinsic viscosity of 0.5–3 dl/g as measured in decalin at 135° C., (2) The ultrahigh-molecular-weight polyethylene is contained in the composition in an amount of 15–35% by weight based on the total weight of the ultrahigh-molecular-weight polyethylene and the low-molecular-weight to high-molecular-weight polyethylene, (3) the composition has an intrinsic viscosity $[\eta]c$ of 4.0–10 dl/g as measured in decalin of 135° C., (4) the composition has a melt torque T of 4.5 kg.cm or below, and (5) a section of an injection-molded square plate produced from the composition has a phase-separated structure composed of a continuous phase and a discontinuous phase and the average particle diameter, measured as average major axis length, of the discontinuous phase is 15 μm or below.

6. The polyolefin composition set forth in claim 5, wherein the ultrahigh-molecular-weight polyethylene and the low-molecular-weight to high-molecular-weight polyethylene are produced in a multi-step polymerization process wherein ethylene is polymerized in at least one polymerization step in the presence of a Ziegler-type catalyst formed by (A) a highly active titanium catalyst component containing magnesium, titanium and a halogen as essential elements and (B) an organoaluminum compound catalyst component to produce an ultrahigh-molecular-weight polyethylene having an intrinsic viscosity of 15–35 dl/g and, in another polymerization step, ethylene is polymerized in the presence of hydrogen to produce a low-molecular-weight to high-molecular-weight polyethylene having an intrinsic viscosity of 0.5–3 dl/g.

* * * * *

UNITED STATES PATENT AND TRADEMARK OFFICE
CERTIFICATE OF CORRECTION

PATENT NO. : 4,933,393
DATED : June 12, 1990
INVENTOR(S) : Akinori Toyota, et al.

It is certified that error appears in the above-identified patent and that said Letters Patent is hereby corrected as shown below:

Col. 16, clm 1, line 37, after "[η]", insert --c--.

Col. 17, clm 3, line 10, after "[η]", insert --c--.

Signed and Sealed this

Second Day of July, 1991

Attest:

HARRY F. MANBECK, JR.

*Attesting Officer*     *Commissioner of Patents and Trademarks*